(12) United States Patent
Yoshida et al.

(10) Patent No.: US 11,426,923 B2
(45) Date of Patent: Aug. 30, 2022

(54) METHOD FOR MANUFACTURING A SLEEVED PRODUCT

(71) Applicant: Fuji Seal International, Inc., Osaka Osaka (JP)

(72) Inventors: Nao Yoshida, EE Eindhoven (NL); Ernst Christian Koolhaas, TT Nuenen (NL)

(73) Assignee: Fuji Seal International, Inc., Osaka (JP)

( * ) Notice: Subject to any disclaimer, the term of this patent is extended or adjusted under 35 U.S.C. 154(b) by 0 days.

(21) Appl. No.: 17/393,514

(22) Filed: Aug. 4, 2021

(65) Prior Publication Data
US 2021/0362400 A1 Nov. 25, 2021

Related U.S. Application Data

(63) Continuation of application No. 15/578,121, filed as application No. PCT/EP2016/061929 on May 26, 2016, now abandoned.

(30) Foreign Application Priority Data

May 29, 2015 (NL) ..................................... 2014885

(51) Int. Cl.
*B29C 63/42* (2006.01)
*B29C 61/02* (2006.01)
(Continued)

(52) U.S. Cl.
CPC .............. *B29C 61/02* (2013.01); *B29C 63/40* (2013.01); *B29C 63/42* (2013.01); *B32B 27/08* (2013.01);
(Continued)

(58) Field of Classification Search
CPC ................................ B29C 63/42; B29C 61/02
See application file for complete search history.

(56) References Cited

U.S. PATENT DOCUMENTS 4,325,762 A 4/1982 Burmeister et al.
4,859,903 A 8/1989 Minematu et al.
(Continued)

FOREIGN PATENT DOCUMENTS

EP 1067166 A2 1/2001

OTHER PUBLICATIONS

International Search Report and Written Opinion dated Sep. 5, 2016, for International Application No. PCT/EP2016/061929, 10 pages.

*Primary Examiner* — Philip C Tucker
*Assistant Examiner* — John Blades
(74) *Attorney, Agent, or Firm* — Frost Brown Todd LLC

(57) ABSTRACT

A method of activating the shrink characteristic of multi-layered film (1), the method comprising the steps of providing a multi-layered film comprising at least a base layer film (2) that comprises a shrinkable film, a photothermic layer (3), associated with the base layer film, and comprising a photothermic material, exposing the multi-layered film (1) to electromagnetic radiation in order for the photothermic material to generate heat and shrink the multi-layered film (1), wherein the electromagnetic radiation comprises UV-light having a peak wavelength between 200 nm and 399 nm, and at least 90% of the UV-light is within a bandwidth of ±30 nm of the peak wavelength.

17 Claims, 8 Drawing Sheets

(51) Int. Cl.

| | |
|---|---|
| *B65B 53/02* | (2006.01) |
| *B29C 63/40* | (2006.01) |
| *B32B 27/08* | (2006.01) |
| *B32B 27/30* | (2006.01) |
| *B32B 27/36* | (2006.01) |
| *B65B 53/00* | (2006.01) |
| *B29L 31/00* | (2006.01) |

(52) U.S. Cl.
CPC ............ *B32B 27/302* (2013.01); *B32B 27/36* (2013.01); *B65B 53/00* (2013.01); *B65B 53/02* (2013.01); *B29L 2031/7158* (2013.01); *B32B 2307/736* (2013.01); *B32B 2325/00* (2013.01); *B32B 2439/60* (2013.01)

(56) References Cited

U.S. PATENT DOCUMENTS

| | | |
|---|---|---|
| 2003/0068453 A1 | 4/2003 | Kong |
| 2005/0142313 A1 | 6/2005 | Grah |
| 2006/0138387 A1 | 6/2006 | Fan et al. |
| 2006/0275564 A1 | 12/2006 | Grah et al. |
| 2007/0069624 A1 | 3/2007 | Dutta et al. |
| 2007/0104931 A1 | 5/2007 | Ito et al. |
| 2007/0235689 A1 | 10/2007 | Marking et al. |
| 2008/0197540 A1 | 8/2008 | McAllister |
| 2012/0107574 A1* | 5/2012 | Mitchell ................. B29C 63/40 156/84 |
| 2016/0284248 A1* | 9/2016 | Banno ...................... G09F 3/04 |

* cited by examiner

METHOD FOR MANUFACTURING A SLEEVED PRODUCT

PRIORITY

This application is a continuation application of U.S. application Ser. No. 15/578,121, entitled "Method For Manufacturing A Sleeved Product," filed on Nov. 29, 2017, which claims priority to PCT Application No. PCT/EP2016/061929, entitled "Method For Manufacturing A Sleeved Product," filed on May 26, 2016, which claims priority to NL Application No. 2014885, entitled "Method For Manufacturing A Sleeved Product," filed on May 29, 2015, the disclosures of which are incorporated by reference herein.

FIELD OF INVENTION

The present invention relates to a method of activating the shrink characteristic of a multi-layered film, and a method for manufacturing a sleeved product.

BACKGROUND

Shrinkable films are commonly used to label products such as plastic containers or glass bottles.

Examples of products labelled with shrinkable films include detergent bottles, milk and yoghurt containers, jam jars and medicine bottles.

Shrinkable films, and in particular heat-shrinkable films, are designed to contract or shrink when heated and, in doing so, substantially conform to the shape of the product the film is being used to label.

It is known to activate the shrink characteristic of a heat-shrinkable film using steam and/or hot air, for example, by carrying the label and product through a tunnel provided with steam and/or hot air. US 2008/0197540 A1 for example discloses a multi-layered film that may be shrunk around an item in a heat tunnel using steam or hot air. However, there are some disadvantages associated with using hot steam and/or hot air to label products. For example, the hot steam and/or air may undesirably heat a substance contained within the product. Also, labels shrunk using hot steam and/or air often do not conform completely to all of the contours of the product, especially if the product has a complex shape.

It is also known to use UV light to shrink shrinkable films. Such films typically comprise a material that is capable of absorbing UV light. When the material absorbs the UV-light, heat may be generated and it is this generated heat that causes the shrinkable film to contract. US 2005/0142313 A1 for instance discloses a method of shrinking a film that comprises the steps of providing a shrink film and exposing the film to an amount of radiation energy effective to activate the shrink characteristics of the film. The film comprises single-walled carbon nanotube material as photothermic material. The effective amount of radiation energy may for instance comprise one or more of any of visible light, infrared light, ultraviolet light, microwave and radio wave.

Typical UV-emitting devices are known from US 2007/0235689 A1, US 2007/006924 A1, U.S. Pat. No. 4,859,903, EP 1067166 A2, and US 2006/0138387 A1.

The present invention is directed towards an improved method of activating the shrink characteristic of a multi-layered film.

SUMMARY

The present invention provides a method of activating the shrink characteristic of a multi-layered film, the method comprising the steps of: providing a multi-layered film comprising at least a base layer film that comprises a shrinkable film, and a photothermic layer, associated with the base layer film, and comprising a photothermic material, exposing the multi-layered film to electromagnetic radiation in order for the photothermic material to shrink the multi-layered film; wherein the electromagnetic radiation comprises UV-light having a peak wavelength between 200 nm and 399 nm, and at least 90% of the UV-light is within a bandwidth of ±30 nm of the peak wavelength.

This method has the advantage of providing improved shrinkage of the multi-layered film. For example, the method produces more homogenous shrinkage of the multi-layered film.

The method of the present invention involves exposing the film to UV light, where at least 90% of the UV-light that falls within ±30 nm of the peak wavelength. This means that 90% of all of the UV radiation used falls within a 60 nm range.

If the intensity of the UV light used in the method of the present invention was to be plotted on a graph against the wavelength of the UV light, there would be a peak on this graph for the peak wavelength. In addition, at least 90% of the total intensity of the UV light would fall within ±30 nm of this peak on the graph.

In some embodiments of the invention, the photothermic layer comprises a white pigment suitable for absorbing UV light (for example, titanium dioxide). For example, the photothermic layer may be formed by printing an ink comprising the white pigment on to a base layer film. Alternatively, the photothermic layer may be formed by printing transparent lacquer comprising a UV absorber, such as a benzotriazole that is capable of absorbing UV light. Again, a transparent lacquer composition comprising said UV absorber may be printed onto the base layer film.

In other embodiments, the photothermic layer may comprise both a transparent lacquer composition, comprising a UV absorber, and an ink composition (comprising a white pigment). For example, if the multi-layered film also comprises a design layer and the photothermic layer is provided on top of this design layer, the photothermic layer may be formed from a transparent lacquer, and a white ink composition may be provided below the design layer at its back side in order to increase the contrast and brilliance of the design layer.

In some embodiments at least 90% of the UV-light is within a bandwidth of ±10 nm of the peak wavelength.

In preferred embodiment of the invention, the electromagnetic radiation may comprise UV-light having a peak wavelength of 365 nm, or 385 nm, or 395 nm, wherein at least 75% of the UV-light is within a bandwidth of ±10 nm of the peak wavelength.

In a more preferred embodiment, the electromagnetic radiation may comprise UV-light having a peak wavelength of 365 nm or 385 nm, wherein at least 90% of the UV-light is within a bandwidth of 10 nm of the peak wavelength.

Preferably, the UV-light is emitted by a LED-UV emitter.

The UV-light preferably has a peak wavelength between 300 nm and 395 nm, more preferably between 350 nm and 390 nm. For example, the peak wavelength may be 365 nm, 385 nm or 395 nm, with 365 nm and 385 being preferred.

In preferred embodiments of the invention, the base layer film is substantially free from a photothermic material. The base layer film may be a multi-layered laminated base layer film. Preferably, the base film comprises over 95% of a thermoplastic resin.

With 'substantially' is meant in the context of the present application at least 90% of the indicated quantity, more preferably at least 95% of the indicated quantity, and most preferably at least 98% of the indicated quantity.

In embodiments of the invention, the photothermic layer may be provided in direct contact with the base layer film. However, in other embodiments, the photothermic layer may be provided in indirect contact with the base film. For example, the photothermic layer may contact the base film via an intermediate design layer.

Preferably, the multi-layered film has a UV absorption of at least 50%, calculated from transmittance and reflectance as measured by ISO13468-2. The photothermic layer preferably has a UV absorption of at least 50%, more preferably of at least 60%, most preferably of at least 70%, calculated from transmittance and reflectance as measured by ISO13468-2.

In some embodiments of the invention, the photothermic layer is multi-layered and at least one of the photothermic layers has a UV absorption of at least 50%, calculated from transmittance and reflectance as measured by ISO13468-2.

Preferably, the multi-layered film comprises a design layer, associated with the base layer film and/or the photothermic layer, and comprising a colored ink composition. In some embodiments of the invention, the design layer may be the photothermic layer.

Preferably, the design layer is continuous with the base layer film and/or the photothermic layer. However, in some embodiments, the design layer may form a pattern of discontinuous regions, and the multilayer film comprising the base layer, the photothermic layer and the design layer is substantially homogeneously shrunk independent from the pattern. In this context, 'substantially' means at least 90% of the base layer film is shrunk independent from the pattern. The photothermic layer may be discontinuous but is preferably continuous.

Preferably, the photothermic layer and/or the design layer is printed. A photothermic layer may be formed typically by coating the base layer film, comprising the shrink film with a printing ink. Coating of the base layer film is performed by a known or common printing technique. The printing technique may be a common technique and is preferably selected typically from gravure printing and flexographic printing. The photothermic ink printed to form the photothermic layer may comprise but is not limited to a photothermic material, a binder resin, a solvent, and other additives. The solvent is typically evaporated at least partly after deposition of the ink on to the base layer film. This yields a photothermic composition on the base layer film, which photothermic composition then comprises a binder resin, the photothermic material and the other additives. The solvent may be selected from solvents generally used in printing inks, which are exemplified by organic solvents such as toluene, xylenes, methyl ethyl ketone, ethyl acetate, methyl alcohol, ethyl alcohol, and isopropyl alcohol, and water.

The binder resin for use herein is exemplified by, but not limited to, acrylic resins, urethane resins, polyamide resins, vinyl chloride-vinyl acetate copolymer resins, cellulosic resins, and nitrocellulose resins.

The photothermic material comprises a UV-light absorbing material selected from (white) titanium dioxide ($TiO2$); (black) carbon black; (cyan) phtalocyanide; (magenta) quinacridone, diketopyrrolopyrrole, naphtol-based azo pigment, anthraquinone; (yellow) aceto acetic acid- and/or anhydride-based azo pigment; dioxiazine and benzotriazole UV absorber; and combinations thereof. Each of the photothermic materials, binder resins, and solvents may be used alone or in combination in each category.

In the photothermic composition, a white ink composition comprising titanium dioxide is preferred. When a clear based design is required, a transparent lacquer composition comprising a UV absorber is preferably used as the photothermic composition.

The thickness of the photothermic layer may be selected within wide ranges since the thickness is not particularly critical. A thickness of the photothermic layer of from 0.1 to 10 μm is particularly preferred however.

A design layer in accordance with some embodiments of the invention is defined as a layer that indicates an item such as a trade name, an illustration, handling precautions, and the like. The design layer may be formed typically by coating the shrink film with a colored ink. The coating is performed by a known or common printing technique, and is preferably selected from gravure printing and flexographic printing. The colored ink printed to form the design layer may comprise but is not limited to a photothermic material, a binder resin, a solvent, and other additives. The binder resin for use herein is exemplified by, but not limited to, acrylic resins, urethane resins, polyamide resins, vinyl chloride-vinyl acetate copolymer resins, cellulosic resins, and nitrocellulose resins. Suitable pigments to be used in the design layer include but are not limited to white pigments, such as titanium oxide (titanium dioxide); indigo blue pigments, such as copper phthalocyanine blue; and other coloring pigments such as carbon black, aluminum flake, and mica. These pigments may be selected and used according to an intended purpose. The pigment may also be selected from extender pigments, typically used for gloss adjustment. Suitable extender pigments include but are not limited to alumina, calcium carbonate, barium sulfate, silica, and acrylic beads. The pigment may work as photothermic material. The level of potency is different depending on the pigment. The solvent may be selected from solvents generally used in inks, which are exemplified by organic solvents such as toluene, xylenes, methyl ethyl ketone, ethyl acetate, methyl alcohol, ethyl alcohol, and isopropyl alcohol, and water. Each of such pigments, binder resins, and solvents may be used alone or in combination in each category.

The design layer may have any thickness which is not critical, but preferably ranges from 0.1 to 10 μm.

The base layer film in accordance with the invention comprises a shrinkable film. The shrinkable film for use in the method comprises a layer that serves as a base of the label and which bears strength properties and shrinking properties. One or more thermoplastic resins for use in the shrinkable film may be suitably selected typically according to required properties and cost. Exemplary resins include, but are not limited to, polyester resins, olefinic resins, styrenic resins, poly(vinyl chloride)s, polyamide resins, and acrylic resins. The shrinkable film is preferably made from a polyester film, a polystyrenic film, or a multilayered laminated film of these films. Exemplary polyester resins usable herein include poly(ethylene terephthalate) (PET) resins, poly(ethylene-2,6-naphthalenedicarboxylate)s (PENs), and poly(lactic acid)s (PLAs), of which polyethylene terephthalate) (PET) resins are preferred. Preferred exemplary styrenic resins include regular polystyrenes, styrene-butadiene copolymers (SBSs), and styrene-butadiene-isoprene copolymers (SBISs).

The shrinkable film for use herein may be a single-layer film, or a multilayered laminated film including two or more film layers according typically to required properties and intended use. When use is made of a multilayered laminated film, the multilayered laminated film may include two or more different film layers made from two or more different resins, respectively.

The shrinkable film is preferably a monoaxially, biaxially, or multiaxially oriented film, so as to exhibit shrinking properties. When the shrinkable film is a multilayered laminated film including two or more film layers, at least one film layer of the multilayered laminated film is preferably oriented. When all the film layers are not or only slightly oriented, the shrinkable film may not exhibit sufficient shrinkage properties. The shrinkable film is preferably a monoaxially or biaxially oriented film and is even more preferably a film substantially oriented in a transverse direction or in a machine direction of the film. In other words, the shrinkable film is preferably oriented substantially monoaxially in a transverse direction or in a machine direction. This direction of main orientation will preferably coincide with a circumferential direction of a sleeve or ROSO label.

The shrinkable film may be prepared according to a common procedure such as film formation using a molten material or film formation using a solution. Independently, commercially available shrinkable films are also usable herein. Where necessary, the surface of the shrinkable film may have been subjected to a common surface treatment such as corona discharge treatment and/or primer treatment. The lamination of the shrinkable film, in case of a laminated structure, may be performed according to a common procedure such as coextrusion or dry lamination. Orientation of the shrinkable film may be performed by biaxial drawing in a machine direction (MD) and in a transverse direction (TD) or by monoaxial drawing in a machine or transverse direction. The drawing can be performed according to any of roll drawing, tenter drawing, or tube drawing. The drawing is often performed by conducting drawing in a machine direction according to necessity and thereafter drawing in a transverse direction each at a temperature of from about 70° C. to about 100° C. The draw ratio in the machine drawing may be from about 1.01 to about 1.5 times, and preferably from about 1.05 to about 1.3 times. The draw ratio in the transverse drawing may be from about 3 to about 8 times, and preferably from about 4 to about 7 times.

Though not critical, the thickness of the shrinkable film is preferably from 10 to 100 μm, more preferably from 20 to 80 μm, and even more preferably from 20 to 60 μm. The shrinkable film may be a three-layer film including a core layer and surface layers. In this case, the ratio in thickness among the core layer and the surface layers [(surface layer)/(core layer)/(surface layer)] is preferably from 1/2/1 to 1/10/1. In case a five-layer shrinkable film is used, the ratio in thickness among the core layer and the surface layers [(surface layer)/(core layer)/(surface layer) is preferably from 1/0.5 to 2/2 to 10/0.5 to 2/1.

The shrinkable film may be shrunk or may not be shrunk in UV light without the photothermic layer. The shrinkable film can be shrunk well to combine to a photothermic layer. The percentage of shrinkage in UV light of 6.0 J/cm$^2$ (such as obtained by UV light of a wavelength of 365 nm at 3.3 W/cm$^2$, or a wavelength of 385 nm at 5.5 W/cm$^2$) of the shrinkable film in its main direction of orientation is preferably less than 5%. Although not critical, the percentage of thermal shrinkage of the shrinkable film in its main direction of orientation is preferably less than 10% in hot water at 60° C. for 10 seconds, more preferably less than 10% in hot water at 70° C. for 10 seconds, even more preferably less than 10% in hot water at 80° C. for 10 seconds, and most preferably less than 10% in hot water at 90° C. for 10 seconds. When the shrinkable film has a percentage of thermal shrinkage in its main orientation direction exceeding the above preferred ranges, the stability of storage is higher and the risk to shrink unnecessarily during transportation is reduced. A further advantage of the present embodiments is represented by a limited or even non-existing shrinkage at atmospheric temperatures during transportation, Although not critical, the percentage of thermal shrinkage in a hot glycerin bath at 150° C. for 10 seconds of the shrinkable film in its main direction of orientation is preferably at least 30%. From the viewpoint of accessibility, a shrinkable film having at least 40% of thermal shrinkage in hot water at 90° C. for 10 seconds can also be chosen.

The percentage of shrinkage in UV light of 6.0 J/cm$^2$ (such as obtained by UV light of a wavelength of 365 nm at 3.3 W/cm$^2$, or a wavelength of 385 nm at 5.5 W/cm$^2$) of the base layer film in its main direction of orientation is preferably less than 5%. Although not critical, the percentage of thermal shrinkage of the base layer film in its main direction of orientation is preferably less than 10% in hot water at 60° C. for 10 seconds, more preferably less than 10% in hot water at 70° C. for 10 seconds, even more preferably less than 10% in hot water at 80° C. for 10 seconds, and most preferably less than 10% in hot water at 90° C. for 10 seconds. When the base layer film has a percentage of thermal shrinkage in its main orientation direction exceeding the above preferred ranges, the stability of storage is higher and the risk to shrink unnecessarily during transportation is reduced.

Although not critical, the percentage of thermal shrinkage in hot glycerin bath at 150° C. for 10 seconds of the base layer film in its main direction of orientation is preferably at least 30%. In point view of accessibility, the base layer film having at least 40% of thermal shrinkage in hot water at 90° C. for 10 seconds also can be chosen.

The percentage of shrinkage of the multi-layer film in its main direction of direction, as obtained by exposure to UV light of 6.0 J/cm$^2$ (such as obtained by UV light of a wavelength of 365 nm at 3.3 W/cm$^2$, or a wavelength of 385 nm at 5.5 W/cm$^2$), is preferably at least 15%, more preferably from 30% to 80%, and even more preferably from 50% to 80%. This embodiment yields a higher total shrinkage after the shrinkage treatment, which is beneficial in sleeving irregularly shaped containers or bottles. When the multilayer film has a percentage of shrinkage by UV light in its main orientation direction exceeding the above preferred ranges, the film when shrunk conforms substantially completely to substantially all contours of the product to be sleeved, in particular when the product has a complex shape.

Although not critical, the percentage of thermal shrinkage of the multi-layer film in its main direction of orientation is preferably less than 10% in hot water at 60° C. for 10 seconds, more preferably less than 10% in hot water at 70° C. for 10 seconds, even more preferably less than 10% in hot water at 80° C. for 10 seconds, and most preferably less than 10% in hot water at 90° C. for 10 seconds. When the multi-layer film has a percentage of thermal shrinkage in its main orientation direction exceeding the above preferred ranges, the stability of storage is higher and the risk to shrink unnecessarily during transportation is reduced.

Although not critical, the percentage of thermal shrinkage in hot glycerin bath at 150° C. for 10 seconds of the multi-layer film in its main direction of orientation is preferably at least 30%. From the point of view of accessibility, a multi-layer film having at least 40% of thermal shrinkage in hot water at 90° C. for 10 seconds can also be chosen.

As used herein the term "main orientation direction" refers to a direction in which the drawing process of the shrinkage film has been mainly performed (i.e., a direction in which the percentage of thermal shrinkage is largest) and, when the shrinkable label is a tubular shrinkable label, the main orientation direction will generally be in a width direction of the film.

The percentage of shrinkage of the multi-layered film in a direction perpendicular to the main orientation direction by exposure to UV light of 6.0 J/cm$^2$ (365 nm at 3.3 W/cm$^2$; or 385 nm at 5.5 W/cm$^2$) is preferably from about −10% to about 50%, more preferably from −10% to 20%, and most preferably from −5% to 10%, or from −5% to 3%, although these percentage are not critical.

The transparency of the shrinkable film for use in embodiments wherein the shrinkable film is a transparent film, is preferably less than 15.0, more preferably less than 10.0, and most preferably less than 5.0, in terms of haze (%) determined in accordance with ISO14782. The shrinkable film, when having a haze of 15 or more, may cloud a print and thereby cause insufficient decorativeness when the print is to be seen through the shrinkable film. If the haze of the shrinkable film is within the preferred ranges, it may be possible in some embodiments to print on the backside.

In some embodiments, the base layer film may have a stretch ratio (ST ratio) of at least three in one or more directions.

The multi-layer film preferably has a UV shrinkage of at least 15% in main shrinking direction as obtained by exposure to UV light of 6.0 J/cm2.

The base layer film preferably has a UV shrinkage of less than 5% in main shrinking direction as obtained by exposure to UV light of 6.0 J/cm2.

The base layer film has a free shrink in main shrinking direction of less than 10% after immersion in water at 60° C. for 10 sec.

In some embodiments, the photothermic layer may comprise a photothermic composition comprising one or more binder resins and from 3 to 80 wt. % of the photothermic material relative to the weight of the photothermic layer.

The photothermic material may comprise UV-light absorbing material selected from (white) titanium dioxide (TiO2); (black) carbon black; (cyan) phtalocyanide; (magenta) quinacridone, diketopyrrolopyrrole, naphtol-based azo pigment, anthraquinone; (yellow) aceto acetic acid- and/or anhydride-based azo pigment; dioxiazine and benzotriazole UV absorber, benzo triazole, benzophenone, salicylate, triazine and/or cyano acrylate type of UV absorbers; and combinations thereof.

In embodiments of the invention, the photothermic composition of the photothermic layer may comprise a white ink composition, comprising from 20 to 80 wt. % of titanium dioxide relative to the weight of the photothermic layer. Alternatively or additionally, the photothermic composition of the photothermic layer may comprise a transparent lacquer composition comprising a benzotriazol UV absorber.

Exemplary UV absorbers or organic photothermic materials include compounds in the benzophenone type of UV absorbers, such as 2-Hydroxy-4-methoxy benzophenone (e.g., Cyasorb UV 9) and 2-hydroxy-4-octoxy benzophenone (e.g., Cyasorb 531 and CibaR CHIMASSORBR 81). Other exemplary UV absorbers include compounds in the benzotriazole type of UV absorbers, such as 2-(2'-hydroxy-3'-tert-butyl-5'-methylphenyl)-5-chlorobenzotriazole, 2-(2H-hydroxy-3-5-Di-tert-amyllphenyl)benzotriazole, 2-2-hydroxy-5-tert-octylphenyl) benzotriazole, 2-(2H-hydroxy-3-5-di-tert-butylphenyl)benzotriazole, 2-(2-hydroxy-5-methyl phenyl) benzotriazole, and 2-[2-hydroxy-3,5-di-(1, 1-dimethylbenzyl)phenyl]-2H-benzotriazole. Yet other exemplary UV absorbers include p-aminobenzoic acid (PABA), avobenzone, 3-benzylidene camphor, benzylidene camphor sulfonic acid, bisymidazylate, camphor benzalkonium methosulfate, cinoxate, diethylamino hydroxybenzoyl hexyl benzoate, diethylhexyl butamido triazone, dimethicodiethylbenzal malonate (Parsol SLX), dioxybenzone, drometrizole trisiloxane, ecamsule, ensulizole, homosalate, isoamyl p-methoxycinnamate, 4-methylbenzylidene camphor, menthyl anthranilate, octocrylene, octyl dimethyl PABA, octyl methoxycinnamate, octyl salicylate, octyl triazone, oxybenzone, PEG-25 PABA, polyacrylamidomethyl benzylidene camphor, sulisobenzone, bisethylhexyloxyphenol methoxyphenol triazine (e.g., Tinosorb S), methylene bis-benzotriazolyl tetramethylbutylphenol (e.g., Tinosorb M), and trolamine salicylate.

According to a second aspect of the present invention there is a method for manufacturing a sleeved product, the method comprising arranging a sleeve around the product, the sleeve comprising a multi-layered film comprising at least a base layer film comprising a shrinkable film, and a photothermic layer, associated with the base layer film, and comprising a photo-thermal material, exposing the sleeve to electromagnetic radiation in order for the photothermic material to shrink the multi-layered film; wherein the electromagnetic radiation comprises UV-light having a peak wavelength between 200 nm and 399 nm, and at least 90% of the UV-light is within a bandwidth of ±30 nm of the peak wavelength.

Preferably, the sleeve is provided in a flat form and wrapped around a mandrel, whereby two sleeve edge parts to be sealed overlap and/or contact each other in a seam area, and the edges are sealed to provide a tubular sleeve, whereafter the sleeve is opened and ejected around the product.

The sleeve is preferably provided in a flat form and wrapped around the product whereby two sleeve edge parts to be sealed overlap and/or contact each other in a seam area, and the edges are sealed to provide the sleeve. Alternatively, the sleeve may be provided in a preformed tubular form and arranged around the product.

Preferably, at least one of the edge parts does not comprise the photothermic layer in the seam area. This provides reduced shrinkage of the film in the seam area and results in stronger bonding strength between the edge parts.

In some embodiments, the product may have a substantially cylindrical shape comprising a large diameter part and a smaller diameter part, and the sleeve covers at least part of the large diameter and smaller diameter part. In these embodiments, the circumference of the smaller diameter part may be between 15-70% of the circumference of the large diameter part.

BRIEF DESCRIPTION OF THE FIGURES

The accompanying figures are used to illustrate non-limiting exemplary embodiments of the present invention.

DESCRIPTION OF EMBODIMENTS

All of FIGS. 1A to 3 illustrate embodiments of multi-layered films configured to be shrunk by the method of activating the shrink characteristic of a multi-layered film of the present invention.

Figure 1A:
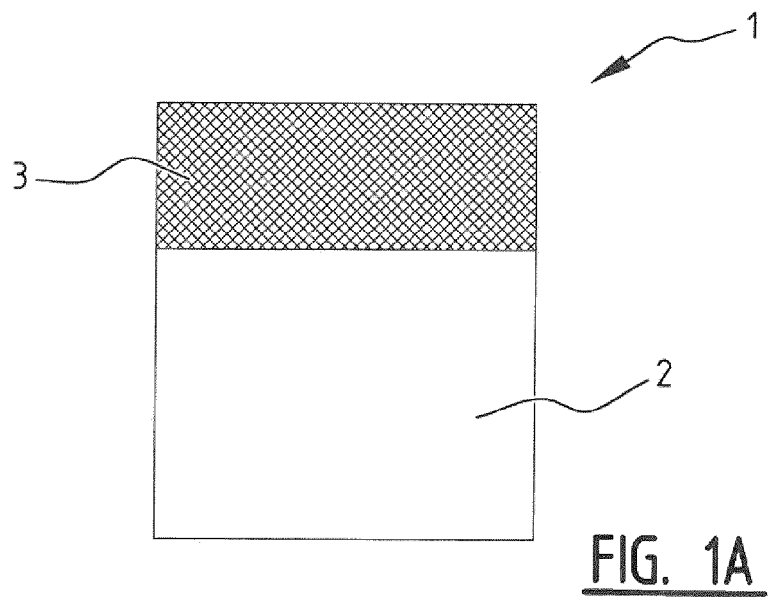
FIG. 1A is a schematic view of a cross section through a first embodiment of a multi-layered film of the present invention.

In FIGS. 1A and 1, the multi-layered film 1 comprises a base layer film 2 and a photothermic layer 3. The layer 3 may also be a photothermic layer in case only one color is used. The layer 3 is a combined photothermic and design layer when more than one color is used such that a design may be noted. In FIG. 1A, the combined photothermic and design layer 3 has been printed on top of the base layer film 2, whereas in FIG. 1B, combined photothermic and design layer 3 has been printed below the base layer film 2. In FIGS. 1A to 3, a bottom or lower side of the film is defined as a side of the film that faces or touches a product surface when applied onto said product, whereas a top or upper side of the film relates to a side of the film that faces a UV light source when irradiated.

In FIG. 1A, the combined photothermic and design layer 3 may be formed from a transparent lacquer. As well as having good UV absorption properties, this transparent lacquer may provide a protective layer. This is because when the film 1 of FIG. 1A is fitted around a product, it is the base layer film 2 that will be in contact with the product, and the combined photothermic and design layer 3 will form the top layer of the film 1.

Figure 1B:
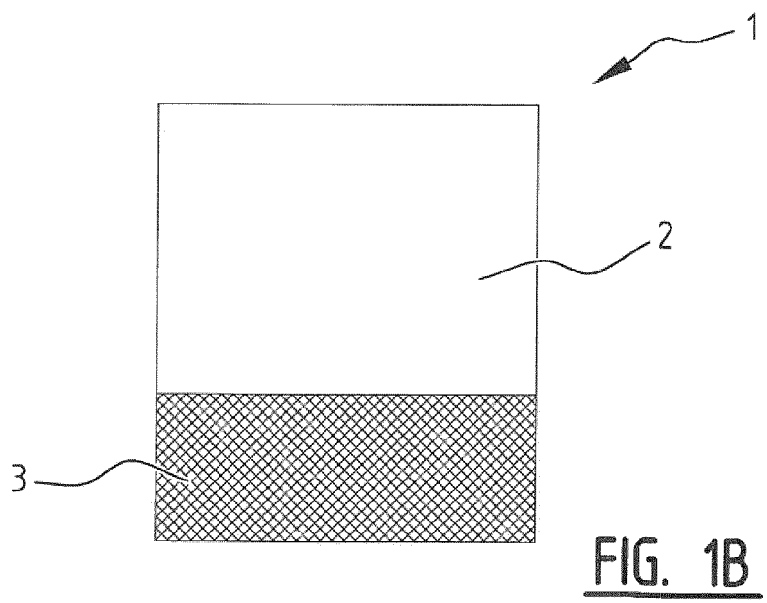
FIG. 1B is a schematic view of a cross section through a second embodiment of a multi-layered film of the present invention.

The combined photothermic and design layer 3 of the film 1 of FIG. 1B may also be formed from a transparent lacquer. However, in contrast to the first embodiment, it is the combined photothermic and design layer 3 of this second embodiment that will come into contact with a product. Therefore, in addition to providing good UV absorption, this embodiment protects the combined photothermic and design layer 3 against scratching.

Alternatively, the combined photothermic and design layer 3 of the embodiment of FIGS. 1A and 1B may be formed from coloured inks, for example, black and white inks, where these inks also have good UV absorption properties.

In FIGS. 1C to 1F, the multi-layered film 1 is provided with separate photothermic and design layers 4, 5.

Figure 1C:
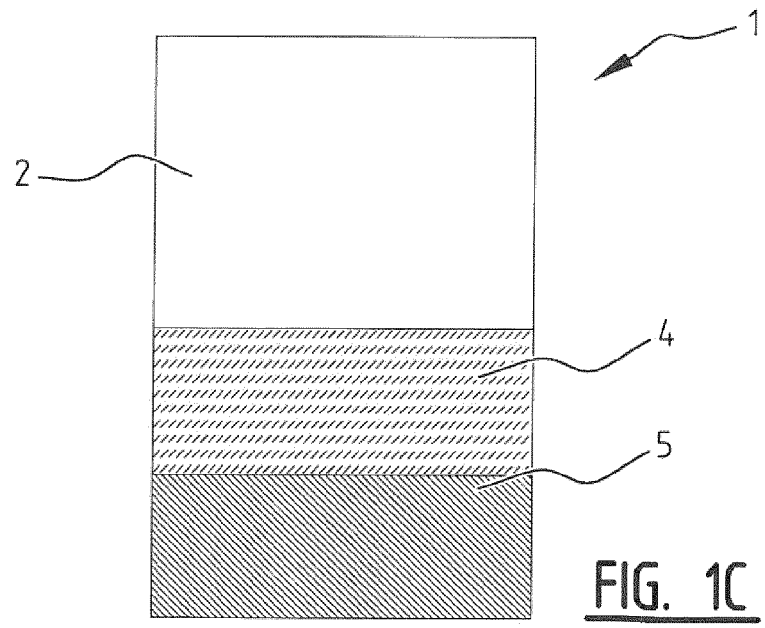
FIG. 1C is a schematic view of a cross section through a third embodiment of a multi-layered film of the present invention.

In the embodiment of FIG. 1C, the film 1 is provided with a photothermic layer 4 provided directly below the base layer film 2, and a separate design layer 5 provided on the photothermic layer 4. With this embodiment, the photothermic layer 4 may also comprise a transparent lacquer that has good UV absorption properties. Preferably, the photothermic layer 4 will act as a binder between the base layer film 2 and the design layer 5.

Figure 1D:
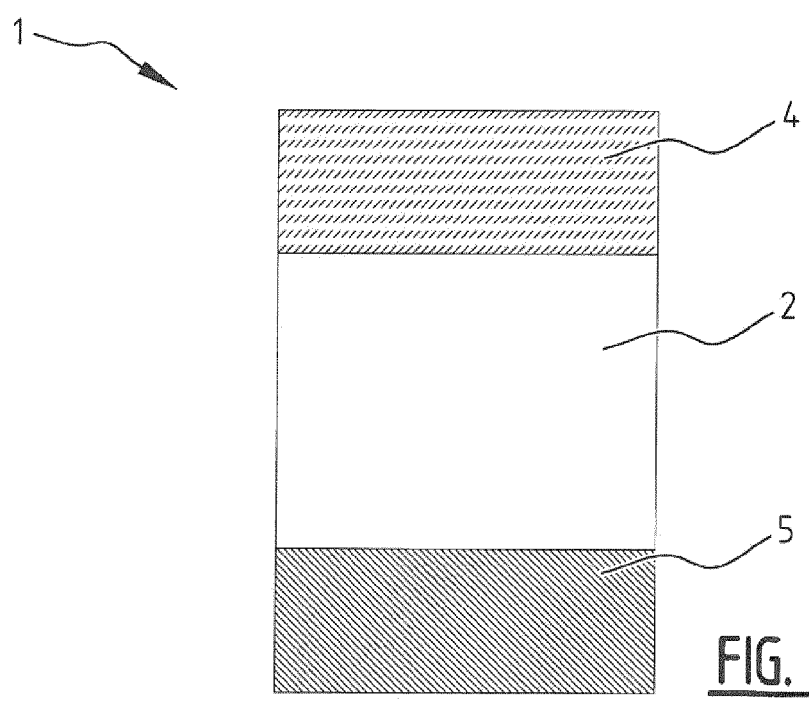
FIG. 1D is a schematic view of a cross section through a fourth embodiment of a multi-layered film of the present invention.

FIG. 1D illustrates an embodiment of the invention comprising a photothermic layer 4 provided on the upper surface of the base layer film 2 and a design layer 5 provided on the lower surface of the base layer film 2. In this embodiment, the photothermic layer 4 may once again be formed from a transparent lacquer that has good UV absorption properties. As the lacquer is provided on top of the base layer film 2, the photothermic layer 4 will form the outer layer of the film 1 and so, preferably, the lacquer additionally provides a protective coat for the film 1.

In addition, in FIGS. 1C and 1D, the design layer 5 forms the lowermost layer of the film 1. This means, therefore, that both the photothermic layer 4 and the base layer film 2 should be transparent so that the design can be seen when it is viewed through both the photothermic and base layer film (4, 2).

In all of the embodiments of FIGS. 1A to 1D, the layer comprising the photothermic material (either the photothermic layer 4 or the combined photothermic and design layer 3) is provided directly on the base layer film 2.

Figure 1E:
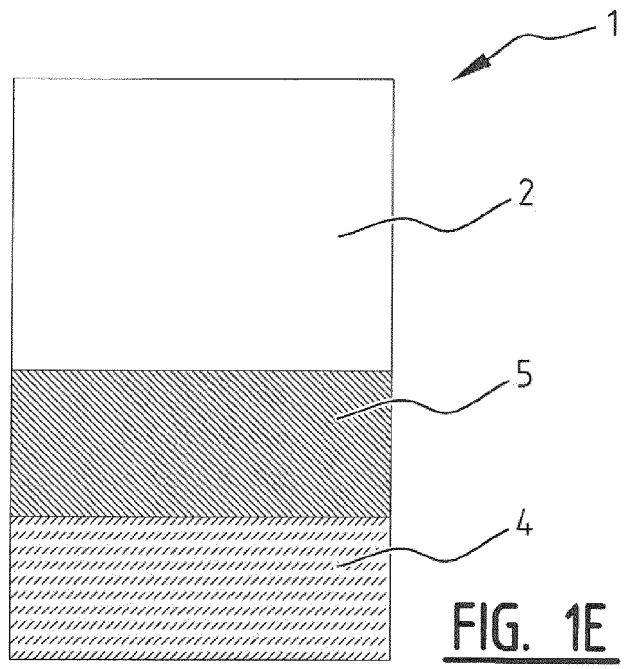
FIG. 1E is a schematic view of a cross section through a fifth embodiment of a multi-layered film of the present invention.
Figure 1F:
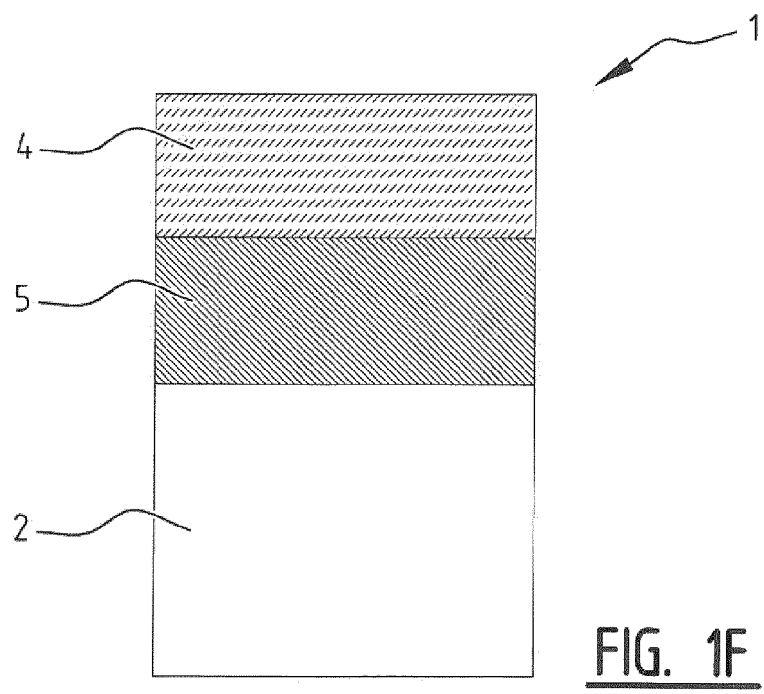
FIG. 1F is a schematic view of a cross section through a sixth embodiment of a multi-layered film of the present invention.

In contrast, in the embodiments of FIGS. 1E and 1F, the photothermic material is provided in a photothermic layer 4 that is in indirect contact with the base layer film 2. In other words, in the embodiments of FIGS. 1E and 1F, the design layer 5 lies between the base layer film 2 and the photothermic layer 4.

In FIG. 1E, the film 1 is provided with a base layer film 2 as the outmost layer. A design layer 5 is then provided on the lower surface of this base layer film 2, and a photothermic layer 4 is provided below the design layer 5. In this embodiment, the photothermic layer 4 could comprise a transparent lacquer or coloured inks (such as black and white ink). Both the lacquer and the coloured inks would have good UV absorption properties.

In the embodiment of FIG. 1F, the photothermic layer 4 and the design layer 5 are both provided on the upper surface of the base layer film 2. In particular, in this embodiment, the design layer 5 is sandwiched between the photothermic layer 4 and the base layer film 2. As the design layer 5 is positioned below the photothermic layer 4, the photothermic layer 4 must be transparent (for example, a transparent lacquer) or the design would not be visible.

As the photothermic layer 4 is provided on an exposed surface of the film 1 in both of FIGS. 1E and 1F, this layer 4 can once again act as a protective layer. In the embodiments of FIGS. 1E and 1F, the photothermic layer 4 is protecting the design layer 5.

Figure 2:
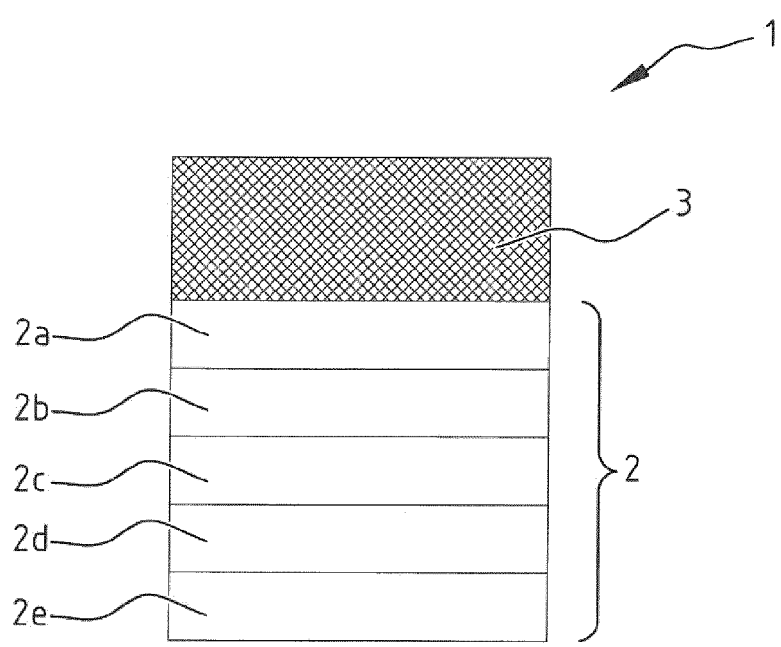
FIG. 2 is a schematic view of a cross section through a seventh embodiment of a multi-layered film of the present invention.

The embodiment of FIG. 2 shows a film 1 comprising a combined photothermic and design layer 3 and a base layer film 2 comprising a multi-layered laminated film formed from five separate layers 2a, 2b, 2c, 2d, 2e. The multilayered laminated film may have any number of layers, preferably three or five. The base layer film 2 comprising a multi-layered laminated film in the present embodiment comprises a core layer 2c of polystyrene (PS), two middle layers (2b, 2d) of a blend of polyethylene terephthalate (PET) and polystyrene (PET/PS), and two surface layers (2a, 2e) of polyethylene terephthalate (PET).

Figure 3A:
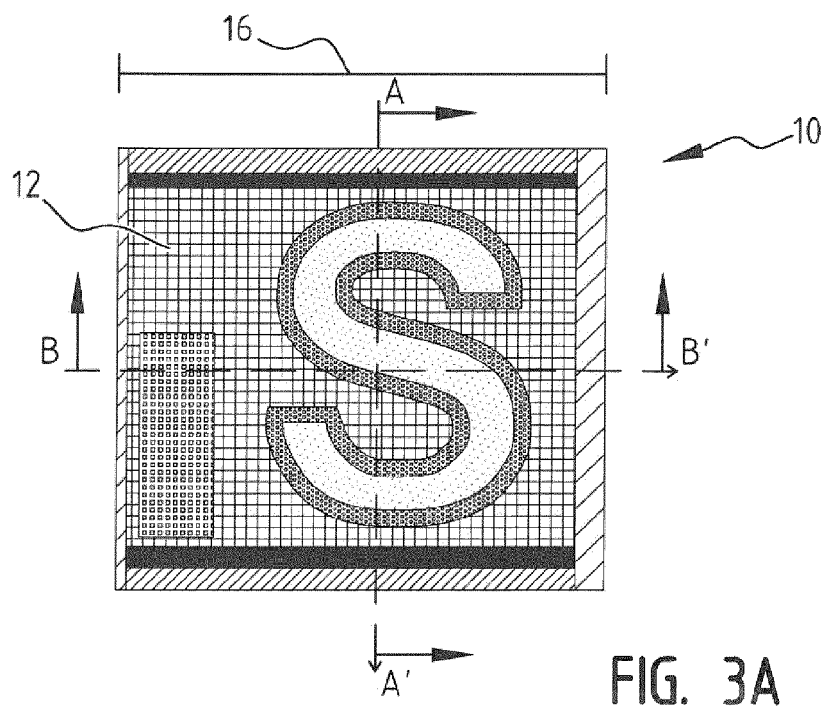
FIGS. 3A to 3C are a front view and two cross-sectional views of an eighth embodiment of a multi-layered film of the present invention.
Figure 3B:
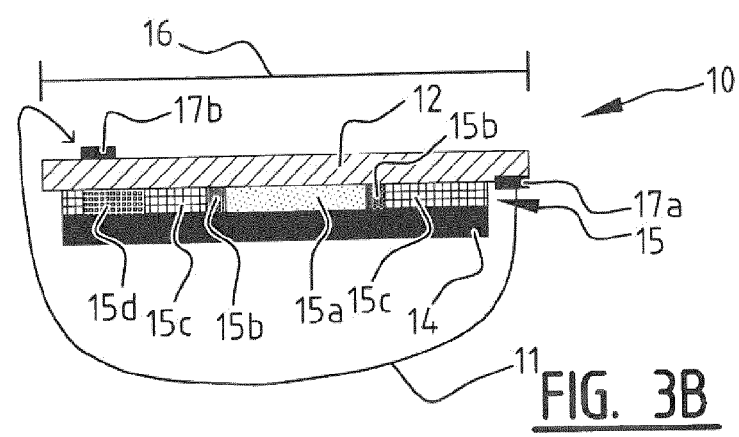
Figure 3C:
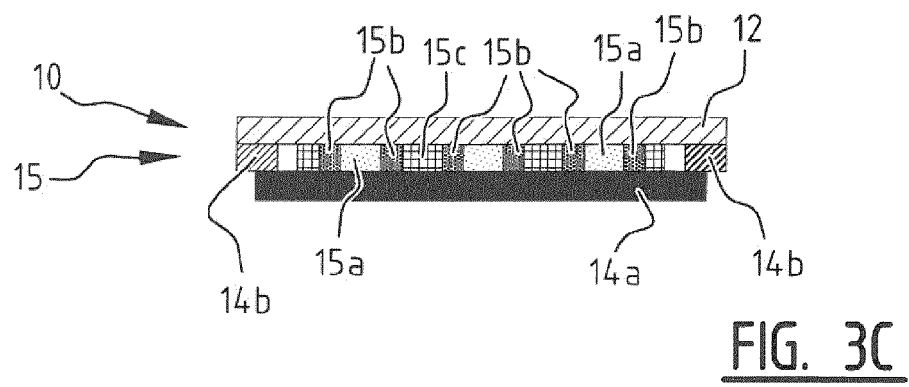

FIG. 3A shows a front view of a multi-layered film 10 provided with a design. As shown in FIGS. 3B and 3C which respectively show a cross-section according to lines B-B' and A-A', the film 10 comprises a base layer film 12, a photothermic layer 14 and a design layer 15. The horizontal direction (B-B' direction) is the direction of main orientation. The photothermic layer 14 in this embodiment comprises a white ink composition 14a and a transparent lacquer composition 14b that includes a photothermic material, while the design layer 15 comprises a plurality of colored ink compositions comprising a pigment. The printed colored ink compositions (15a, 15b, 15c, . . . ) together define the design as best shown in FIG. 3A. The UV absorption and shrinkage of each of the printed colored ink compositions (15a, 15b, 15c, . . . ) are different depending on the used pigment in the printed colored ink compositions (15a, 15b, 15c, . . . ). Even if the multi-layer film 10 is comprised of partial design layers (15a, b, c) including different pigments, the complete area covered and not covered by design layers 15 can be shrunk and will not show a substantial difference of shrinkage ratio, because the multi-layer film 10 has a photothermic layer 14 that covers the complete area of the base layer film 12. As shown in FIG. 3C, a top and bottom end of the film 10 has a transparent area comprising a photothermic layer formed by a transparent lacquer composition.

As shown in FIG. 3B, this photothermic layer 14 and the design layer 15 do not extend over the complete width 16 of the film 10 but leave some free area in which a seaming area 17a is applied for seaming in a next step. Seaming is performed by wrapping the film 10 around a product such that one end section (seaming area 17a) of the film 10 that is, for the purpose, provided with solvent or adhesive is brought in contact with another seaming area 17b at another end of the film 10, in accordance with arrow 11 and both seaming areas (17a, 17b) pressed against each other to provide the seam. It is noted that the seaming areas (17a, 17b) and the arrow 11 are shown to explain the relationship to the next step, but are not part of the cross-section of FIG. 3B. The arrangement shown makes it clear that shrinkage of the seaming area 17a can occur since a photothermic layer 14 is present in area 17b, even though the seaming area 17a is substantially free of photothermic material.

Figure 4:
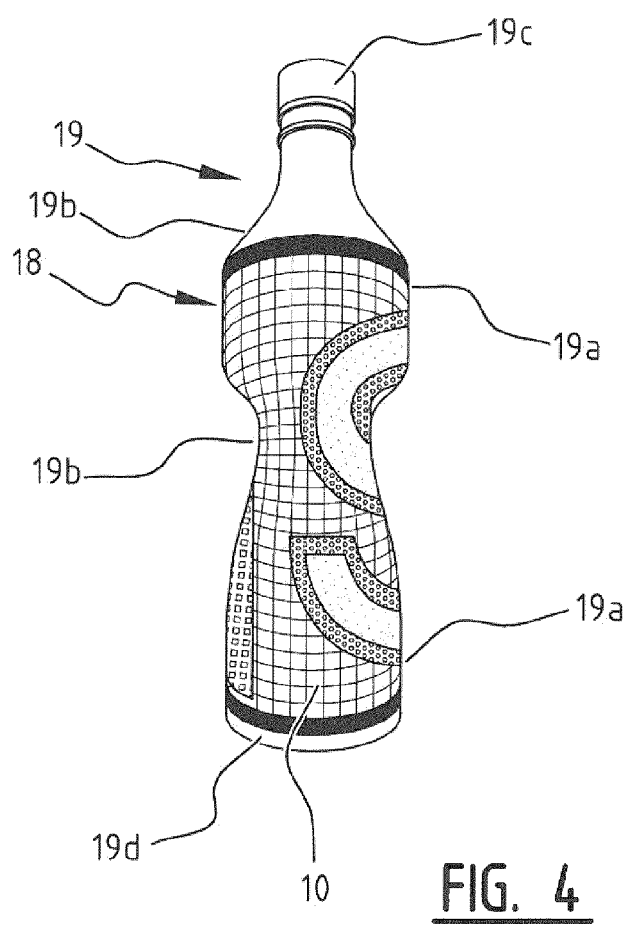
FIG. 4 shows a bottle that has been provided with a shrink sleeve comprising the multi-layered film of FIGS. 3A to 3C.

Referring to FIG. 4, the film 10 when shrunk by a UV-light source forms a tight sleeve 18 around the product, which in the embodiment shown in FIG. 4 is a bottle 19, having a large diameter part 19a and a smaller diameter part 19b, a top part with a cap 19c, and a bottom part 19d. The bottom part 19d may also be provided with a shrunk film 10 if desired. In the sleeved configuration shown in FIG. 4, the photothermic layer 14 of white ink faces the outer surface of the bottle 19, while the base layer film 12 faces outside towards a radiation source for shrinking the sleeve. The method of the invention allows to tightly shrink a film 10 around a bottle 19 having large and small diameter parts (19a, 19b).

Figure 5A:
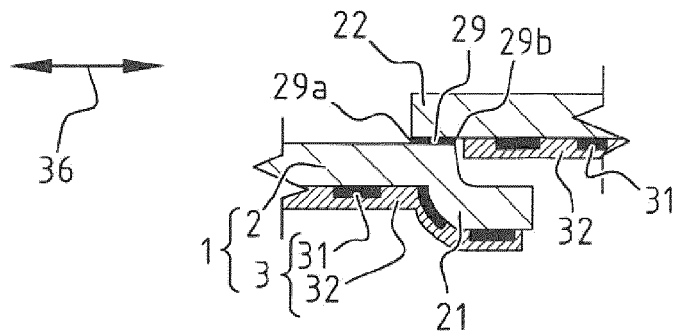
FIGS. 5A to 5C show cross-sections of three further embodiments of a multi-layered film of the present invention in a seaming area.
Figure 5B:
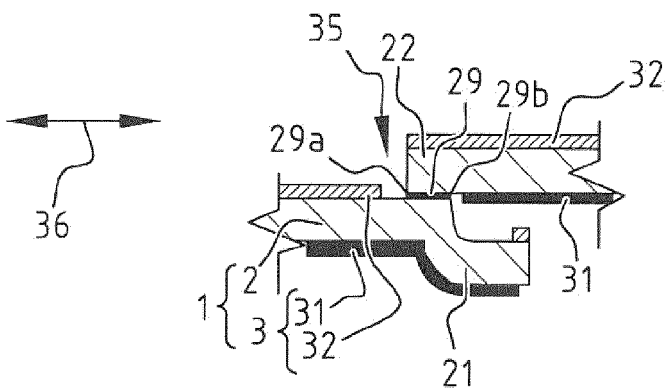
Figure 5C:
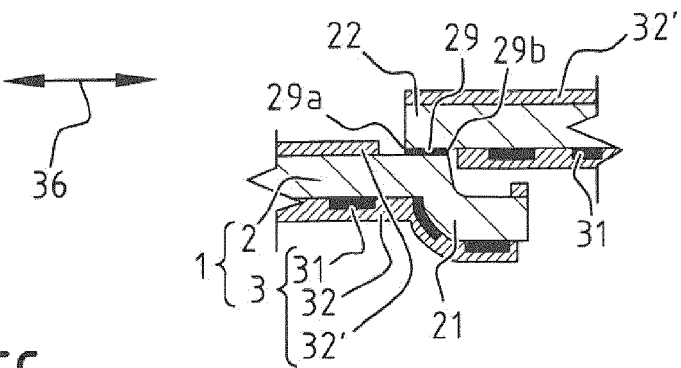

FIGS. 5A to 5C show yet other embodiments of a multi-layered film 1 that may be subject to shrinkage in accordance with the invented method. The film 1 comprises a base layer film 2 and a printed layer 3, the latter comprises a design layer 31 and a photothermic layer 32. The base layer film 2 has an end part 22 that defines a seaming area 29 having a first end 29a and a second end 29b, as has already been explained above in the context of FIGS. 3A to 3C. In an overlapping arrangement, end part 22 is brought in line with other end part 21 of base layer film 2 and adhesively bonded in area 29. The embodiment of FIG. 5A has a backing print only, in that the design and photothermic layers (31, 32) are provided on a backside of the film 1 only. The embodiment of figure SA is formed after seaming the embodiment shown in FIG. 1E. The backside of the film 1 is the side facing a sleeved product surface. In the embodiment of figure SA, the photothermic layer 32 in end part 22 overlaps with the photothermic layer 32 in other end part 21.

The embodiment of FIG. 5B has the design layer 31 printed on the backside, and the photothermic layer 32 printed on a surface side of the film 1. The embodiment of FIG. 5B is formed after seaming the embodiment shown in FIG. 1D. The surface side of the film 1 is the side facing away from a sleeved product surface, or, alternatively, facing towards a UV-light source during a shrinkage treatment. The embodiment of FIG. 5C finally has a combined design/photothermic layer (31, 32) printed on the backside, and a photothermic layer 32' printed on a surface side of the film 1. In the embodiments of FIGS. 5A and 5C, the photothermic layer 32 covers substantially the complete area around the seaming area 29 in a circumferential direction 36. In the embodiment of FIG. 5B, there is a small gap 35 which is not covered by the photothermic layer 32, and therefore is not or less subject to shrinkage. Given the small width of the gap 35 in a circumferential direction 36, this is not much of a problem, because the main shrinking direction corresponds to the circumferential direction 36.

Figure 6A:
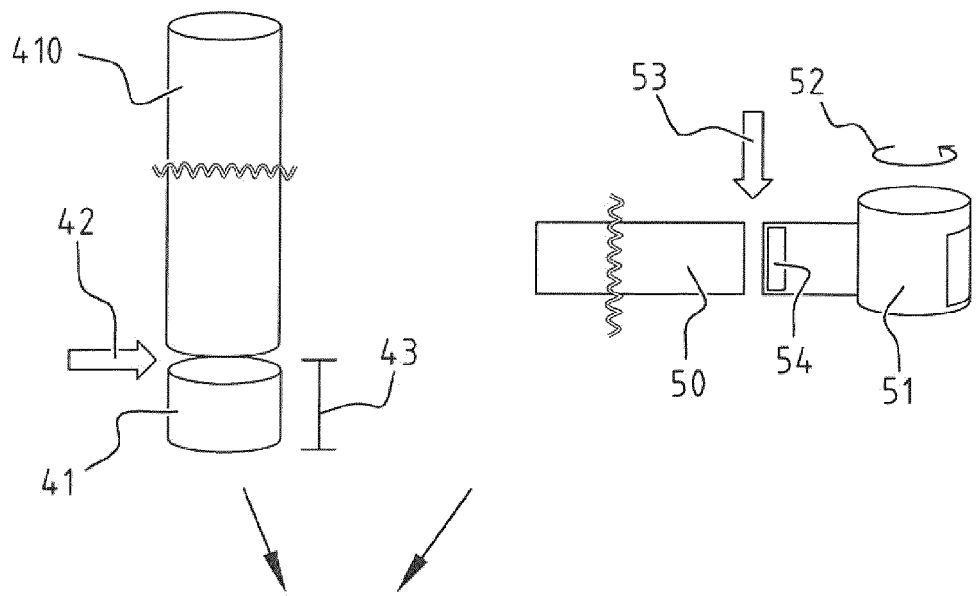
FIGS. 6A and 6B show perspective views of method steps in the manufacturing of a sleeved product in accordance with embodiments of the invention.
Figure 6A:
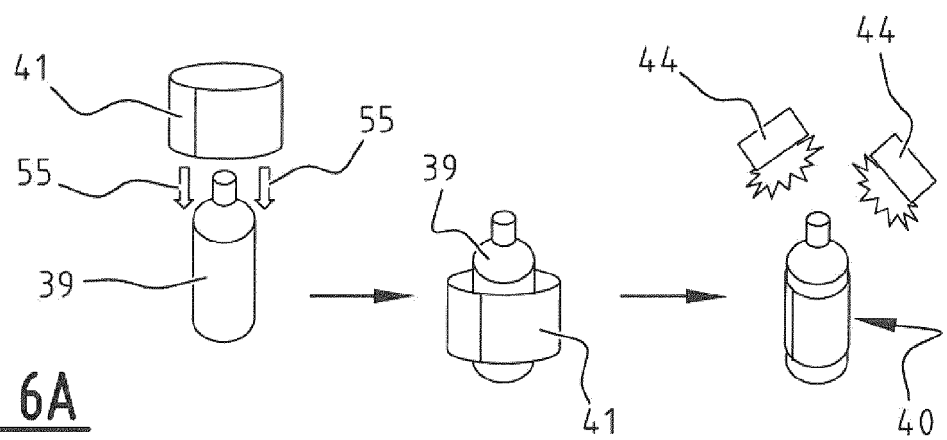
Figure 6B:
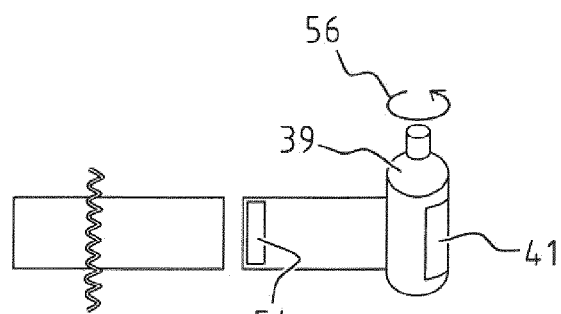

FIGS. 6A and 6B finally disclose possible method steps in embodiments of the invented method. The method for manufacturing a sleeved product 40 comprises arranging a sleeve label 41 around a product, which, in the embodiment shown is a bottle 39. The sleeve 41 comprises an embodiment of a multi-layered film (1, 10) as shown in FIGS. 3 and 5. The sleeve 41 is arranged around the bottle 39 and then exposed to electromagnetic radiation emitted by a plurality of UV LED sources 44. The photothermic material present in the film (1, 10) generates heat and shrinks the multi-layered film (1, 10). As claimed, the electromagnetic radiation comprises UV-light having a peak wavelength between 200 nm and 399 nm, and at least 90% of the UV-light is within a bandwidth of ±30 nm of the peak wavelength.

The sleeve 41 may be provided in a preformed tubular form, the sleeve 41 being cut from an elongated preformed sleeve 410 of the multi-layered film (1, 10) at a pitch 43 in a transverse direction 42 to the axis of the sleeve 41. The circumferential direction of the sleeve 410 corresponds to the main orientation and main shrinkage direction.

In an alternative embodiment, the sleeve 41 is provided in the form of a flat film 50 and a piece of the flat film 50 is cut in a transverse direction 53 to a longitudinal axis of the flat film 50, and then wrapped around a cylindrical mandrel 51 that is rotated in a circumferential direction 52 of the mandrel 51. An edge part of the cut flat film 50 is provided with a strip of adhesive 54 which bonds two overlapping edge parts of the flat film 50 to provide the tubular sleeve 41. A machine direction of the flat film 50 corresponds to the main shrinkage and circumferential direction 52.

To arrange the sleeve 41 around the bottle 39, the sleeve 41 is slightly opened and ejected around the bottle 39 in a direction 55. The sleeve 41 is then exposed to electromagnetic radiation emitted by a plurality of UV LED sources 44, which move relative to the sleeved bottle (39, 40). The relative movement may be achieved by moving the sleeved bottle (39,40) and/or by moving the UV light sources 44, for instance in a circular spinning movement.

As shown in FIG. 6B, when the sleeve 41 is provided in the shape of a flat film 50, the film may also be wrapped immediately around the bottle 39 that is rotated in a circumferential direction 56 of the bottle 39. An edge part of the cut flat film 50 is provided with a strip of adhesive 54 which bonds two overlapping edge parts of the flat film to provide the tubular sleeve 41 around the bottle 39.

UV devices suitable for producing the UV light required for embodiments of the invention include UV-LED lamps with the item code FE300 produced by Phoseon Technology. Details of three FE300 UV-LED lamps with peak wavelengths of 365 nm, 385 nm and 395 nm are outlined in Table 1 below.

According to the invention, a UV-light source having a peak wavelength between 200 nm and 399 nm is used, whereby at least 90% of the UV-light is within a bandwidth of ±30 nm of the peak wavelength. A UV-light emitter having the claimed narrow wavelength distribution may be used, but it is also possible to use a UV light source having a wider wavelength distribution and filtering the light to obtain the claimed narrow wavelength distribution.

Although the power of the UV-light source may be varied within a large range, a preferred power of the UV-light source ranges from 0.5-100 $W/cm^2$, more preferably from 1-30 $W/cm^2$, and most preferably from 3-20 $W/cm^2$. Suitable UV-light emitters are for instance FE300 (365 nm): 3.3 $W/cm^2$, and FE300 (385 nm): 5.5 $W/cm^2$.

The preferred UV LED devices may use any tip disposition, and one line type UV LED emitters such as FE300 (Phoseon), and/or multi line type UV LED emitters such as FJ 100 (Phoseon) may be used.

Preferred lenses may have any shape and comprise rod lenses and flat lenses, whereby a rod lens is more preferred than a flat lens in order to keep the irradiation power at an even distance from the light source. The distance between the UV-light source and the product surface to be irradiated may be varied but is preferably close enough to prevent a large reduction of the irradiation power, which typically reduces with distance. A preferred distance between a product surface to be irradiated and a UV-light source is <75 mm, more preferably <50 mm, even more preferably <30 mm, and most preferably <20 mm.

The product may be irradiated by the UV-light source in a device that allows irradiation of substantially the complete product surface once, or a few times. Preferably, a sleeved product that needs to be irradiated is moved relative to the UV-light source or sources. Movement may be achieved in any conceivable way, such as by hoisting or spinning a product and/or UV-light source, or a line or multi line of UV-light sources or sleeved products.

In addition, for comparison, Table 1 also details an electrodeless lamp produced by Heraeus Noblelight. This lamp does not produce the UV-light required for the method of activating the shrink characteristic of a multi-layered film of the present invention.

Tables 2 to 5 below detail the distribution of relative radiance of each of the lamps listed in Table 1.

As can be seen from Tables 1 to 5, the lamps produced by Phoseon Technology all produce UV-light that is within ±30 nm of the peak wavelength.

TABLE 1

| | | | UV Devices | | | | | |
|---|---|---|---|---|---|---|---|---|
| | Peak wave length | Irradiated wave length | Percentage of intensity in peak ± 10 nm | Percentage of intensity in peak ± 30 mn | Percentage of intensity in peak ± 60 nm | Type | Itemcode of UV Light | Lamp Supplier |
| UV light I | 365 nm | 350 nm-380 nm | 94% | 100% | 100% | UV-LED | FE300 | Phoseon Technology |
| UV light II | 385 nm | 370 nm-400 nm | 93% | 100% | 100% | UV-LED | FE300 | Phoseon Technology |
| UV light III | 395 nm | 380 nm-410 nm | 90% | 100% | 100% | UV-LED | FE300 | Phoseon Technology |
| UVlight IV | 365 nm | 200 nm-500 nm | 15% | 18% | 39% | Electrodeless lamp | LIGHT HAMMER-10; H+ | Heraeus Noblelight |

TABLE 2

UV light I 365 nm

| Wavelength Range | Distribution of Relative irradiance |
|---|---|
| <350 nm | 0% |
| 350 nm-355 nm | 1% |
| 355 nm-360 nm | 8% |
| 360 nm-365 nm | 30% |
| 365 nm-370 nm | 34% |
| 370 nm-375 nm | 22% |
| 375 nm-380 nm | 5% |
| ≥380 nm | 0% |
| Total | 100% |

TABLE 3

UV light II 385 nm

| Wavelength Range | Distribution of Relative |
|---|---|
| <370 nm | 0% |
| 370 nm-375 nm | 1% |
| 375 nm-380 nm | 7% |
| 380 nm-385 nm | 27% |
| 385 nm-390 nm | 41% |
| 390 nm-395 nm | 19% |
| 395 nm-400 nm | 5% |
| ≥400 nm | 0% |
| Total | 100% |

TABLE 4

UV light III 395 nm

| Wavelength Range | Distribution of Relative |
|---|---|
| <390 nm | 2% |
| 390 nm-395 nm | 15% |
| 395 nm-400 nm | 43% |
| 400 nm-405 nm | 30% |
| 405 nm-410 nm | 8% |
| 410 nm-415 nm | 2% |
| Total | 100% |

TABLE 5

UV light IV 365 nm

| Wavelength Range | Distribution of Relative |
|---|---|
| <300 nm | 48% |
| 300 nm-310 nm | 4% |
| 310 nm-320 nm | 7% |
| 320 nm-330 nm | 1% |
| 330 nm-340 nm | 2% |
| 340 nm-350 nm | 0% |
| 350 nm-360 nm | 1% |
| 360 nm-370 nm | 13% |
| 370 nm-380 nm | 1% |
| 380 nm-390 nm | 1% |
| 390 nm-400 nm | 1% |
| 400 nm-410 nm | 6% |
| 410 nm-420 nm | 1% |
| 420 nm-430 nm | 1% |
| ≥430 nm | 13% |
| Total | 100% |

Base Layer

The multi-layer films that are configured to be shrunk on the application of heat comprise a base layer. The base layer film of the multi-layered film comprises a shrinkable film, and preferably comprises over 95% of thermoplastic resin. Suitable types of base layer are detailed in Table 6 below. Their heat shrinkage in TD is shown in the Table 6.

TABLE 6

| | Film | | | | Formulation | | | Spec | | | |
|---|---|---|---|---|---|---|---|---|---|---|---|
| | Name | Thickness (μm) | supplier | Surface | Core | Middle | ST Ratio (TD) | Heat Shrink ratio @60° C. for 10 sec | Heat Shrink ratio @90° C. for 10 sec | Heat Shrink ratio @150° C. for 10 sec | Haze |
| Film I | PETG TD shrink film | Pentalabel® LF-TG10F12-T45 | 50 | Klockner | | PETG | | 4-6R | 0 | 65 | 77 | 2.0 |
| Film II | Hybrid multilayer TD shrink film | Fancylap HG8 | 40 | GUNZE | PETG | Adhesive layer | SBS | 4-6R | 0 | 70 | 78 | 4.0 |
| Fain III | Olefin multilayer TD | Fancylap FL1 | 50 | GUNZE | COC | PP | | 4-6R | 0 | 55 | 76 | 10.0 |

TABLE 6-continued

| | Film | | | Formulation | | | | Spec | | | |
|---|---|---|---|---|---|---|---|---|---|---|---|
| | | | | | | | | | Heat Shrink ratio | Heat Shrink ratio | Heat Shrink ratio | |
| | Name | Thickness (μm) | supplier | Surface | Core | Middle | ST Ratio (TD) | @60° C. for 10 sec | @90° C. for 10 sec | @150° C. for 10 sec | Haze |
| Film IV | APET TD shrink film | 40 | — | — | APET* | | 4R (@90 d) | 0 | 5 | 31 | 2.0 |
| Film V | Aclyic coated BOPP film | 40 | Jindal | Aclylic | PP | | BOPP | 0 | 0 | 7 | 2.0 |
|       | | | | | | | | | | | |
|       | Label-Lyte LL666 | | | | | | | | | | |

The heat shrink ratio of the APET and BOPP films of Table 6 at 130° C. for 2 min is APET: 34%, and BOPP: 3%.

Photothermic and Design Layers

Shrinkable films adapted to be shrunk may also comprise ink in a photothermic layer and/or a design layer. Examples of such inks are listed in Table 7.

These inks may be printed onto another layer of the film, for example the base layer film, using Gravure printing. The layers of printed ink may be 1.0 .mu.m thick. Titanium dioxide may be used in the white ink composition, for instance an amount of 50% by weight of the total white ink composition.

Alternatively, a photothermic layer may comprise a clear lacquer (i.e. a "clear lac"). Suitable lacquers include Lacquers B and C listed in Tables 8-1 and 8-2.

TABLE 7

Color inks for Photothermic layer or Design layer

| Color | Code n. | Name of color Inks | medium | Solvent | Supplier |
|---|---|---|---|---|---|
| White | WB68-0AFG | Pluritech White | NITROBASE CLEAR | 50/50 EtAc/ TSDA | Flint |
| | CSWS-01-21990 | SLEEVEFLEX WHITE | SOLVAFILM P SL TV | nPr-Ac | Sunchemical |
| Cyan | WZ61-15AF | NITROBASE CYAN | NITROBASE CLEAR | 2 TO 1 TSDA/ nPrAc | Flint |
| | YSBL-05-21519/JP01 | Finetap Cyan | SOLVAFILM P SL TV/NC Vanish | nPr-Ac/EtAc | Sunchemical |
| Magenta | INZ61-36BF | NITROBASE MAGENTA | NITROBASE CLEAR | 2 TO 1 TSDA/ nPrAc | Flint |
| | YSBL-04-21521/JP01 | Finetap Magenta | SOLVAFILM P SL TV/NC Vanish | nPr-Ac/EtAc | Sunchemical |
| Yellow | WZ61-55DF | NITROBASE YELLOW | NITROBASE CLEAR | 2 TO 1 TSDA/ nPrAc | Flint |
| | YSBL-02-21517/FJO9 | Finelap Yellow | SOLVAFILM P SL TV/NC Vanish | nPr-Ac/EtAc | Sunchemical |
| Black | WZ61-96BF | NITROBASE BLACK | NITROBASE CLEAR | 2101 ISDA/ nPrAc | Flint |
| | YSBL-09-21524/JP01 | Finelap Black | SOLVAFILM P SL TV;/NC | nPr-Ac/EtAc | Sunchemical |

*inks from Flint is used for example

TABLE 8.1

| Type | Code n. | Medium | Solvent | viscosity | Supplier |
|---|---|---|---|---|---|
| Lacquer A | W863-OVSG | ELIOTECH SL CLEAR | n-propyl Acetate | 18-20 sec | Flint |

TABLE 8.2

| | Formulation (Base lacquer + UV absorber) | | | | Note | |
|---|---|---|---|---|---|---|
| Type | Base lacquer | UV absorber | Solvent | Viscosity | UV Absorber type | Chemical name of UV absorber |
| Lacquer B | Lacquer A (100 wt %) | Tinuvin 328 (3 wt %) | Supplied by BASF n-propyl Acetate | 18-20 sec | Benzotriazol | 2-(2H-benzotriazol-2-yl)-4,6-ditertpentylphenol |
| Lacquer C | Lacquer A (100 wt %) | Seesorb 106 (13 wt %) | Supplied by SHIPRO KASEI KAISHA LTD n-propyl Acetate | 18-20 sec | Benzophenone | Tetrahydroxybenzophenone |

Example 1

Shrink films (i.e. films that are configured to be shrunk) were prepared using a base layer selected from Table 6. In addition, a photothermic layer was applied to this base layer. This photothermic layer comprised one of the Flint inks listed in Table 7, or a clear lacquer selected from those listed in Table 8-2. These films form working examples I-1 to I-11 in Table 9 below.

Comparison examples I-1 to 1-7 listed in Table 9 comprise only a base layer (i.e. there is no photothermic layer). In comparison example I-8, the shrink film comprises Lacquer A in the printed layer. The printed Lacquer A does not comprise a photothermic material.

UV light was applied to these shrink films using one of the UV lamps described in Table 1. The percentage shrinkage of these films by the UV light was then measured and the results of these shrinkage experiments are given in Table 9.

TABLE 9

| | Flat Shrinkage without design layer | | | | | | | | |
|---|---|---|---|---|---|---|---|---|---|
| | | Based Film (B) | | photothermic layer (P) | | | Shinkage by UV | | |
| | UV device | TYPE | UV abs % | Ink type | UV abs | UV abs % | 1.5 J/cm2 | 4 J/cm2 | 6 J/cm2 |
| Comparison example 1-1 | UV light I | Film I | 8% | — | 8% | 0% | 0% | 0% | 0% |
| Comparison example 1-2 | UV light II | Film I | 8% | — | 8% | 0% | 0% | 0% | 0% |
| Comparison example 1-3 | UV llght III | Film 1 | 8% | — | 8% | 0% | 0% | 0% | 0% |
| Comparison example 1-4 | UV light I | Film II | 9% | — | 9% | 0% | 0% | 0% | 0% |
| Comparison example 1-5 | UV light I | Film III | 7% | — | 7% | 0% | 0% | 0% | 0% |
| Comparison example 1.6 | UV light 11 | Film IV | 8% | — | 8% | 0% | 0% | | 0% |
| Comparison example 1-7 | UV light II | Film V | 7% | — | 7% | 0% | 0% | 0% | 0% |
| Comparison example 1-8 | UV right I | Film I | 8% | Lacquer A | 8% | 0% | 0% | 0% | 0% |
| Working example 1-1 | UV light I | Film 1 | 8% | Magenta | 40% | 32% | 0% | 0% | 49% |
| Working example 1-2 | UV light I | Film I | 8% | Cyan | 88% | 80% | 0% | 48% | 77% |
| Wolking example 1-3 | UV light I | Film 1 | 8% | Yellow | 40% | 32% | 0% | 0% | 71% |
| Working example 1-4 | UV light I | Film I | 8% | Black | 97% | 89% | 8% | 63% | 77% |
| Working example 1-5 | UV light I | Film 1 | 8% | White | 94% | 86% | 6% | 43% | 77% |
| Working example 1-7 | UV light 1 | Film II | 9% | White | 93% | 84% | 0% | 58% | 74% |
| Working example 1-8 | UV light I | Film III | 7% | White | 94% | 87% | 4% | 34% | 70% |
| Working example 1-9 | UV light 11 | Film IV | 8% | White | 94% | 86% | | 50% | |
| Working example 1-10 | UV light II | Film V | 7% | White | 94% | 87% | | 17% | |
| Working example 1-6 | UV light I | Film I | 8% | Lacquer B | 87% | 79% | 0% | 33% | 74% |
| Working example 1-11 | UV light I | Film I | 8% | Lacquer C | 89% | 81% | 5% | 45% | 77% |

In the multi-layer films of Table 9, there is no design layer.

Example 2

In Example 2, multi-layer films were prepared from a base layer, a photothermic layer and a design layer. Details of these multi-layer shrink films are listed in Table 10.

The base layer was selected from those examples listed in Table 6, the photothermic layer comprises the white Flint ink listed in Table 7, and the design layer comprises additional flint inks of Table 7.

UV light was applied to the films using one of the UV lamps listed in Table 1. The shrinkage of the multi-layer films of Example 2 was measured and the results are listed in Table 10.

The working examples II-2, 4, 5 and the comparative example II-1 have a continuous backing white on design layer that is printed with a number of color inks (cyan, magenta, black, yellow) to eliminate overlap with each design ink below a base layer.

In working example II-3 a continuous transparent lacquer comprising photothermic material shown as lacquer B in table 8 is printed on top of a base layer film together with a number of color inks (cyan, magenta, black, and yellow) to eliminate overlap with each design ink on the other side of the base layer film, meaning below the base layer film.

When any color is described as a design layer in the table, it means that the part does not have a design layer.

TABLE 10

Flat Shrinkage with design layer

| | UV device | Film TYPE | Film UV abs % ① | photothermic layer Color | photothermic layer UV abs % (B+P = ②) | photothermic layer UV abs % (P = ②–①) | Design layer Color | Design layer UV abs % (B+D = ③) | Design layer UV abs % (D = ③–①) | Total layer UV abs % (B+P+D) | Total layer Min abs % | Free Shrinkage (A) by light 0.4 J/cm2 | dispersion of shrinkage (2σ) 0.4 J/cm2 | Free shrinkage (B) by light Classification |
|---|---|---|---|---|---|---|---|---|---|---|---|---|---|
| Comparison example II-1 | UV light IV | Film I | 8% | White White White White | 94% 94% 94% 94% | 86% 86% 86% 86% | — Magenta Cyan Black | — 40% 88% 97% | — 32% 80% 89% | 94% 97% 97% 97% | 94% | 37% 54% 59% 64% | 23% | B |

| | UV device | Film TYPE | Film UV abs % ① | photothermic layer Color | photothermic layer UV abs % (B+P = ②) | photothermic layer UV abs% (P = ②–①) | Design layer Color | Design layer UV abs % (B+D = ③) | Design layer UV abs% (D = ③–①) | Total layer UV abs % (B+P+D) | Total layer Min abs % | Free Shrinkage (A) by light 1.5 J/cm2 | Free Shrinkage 4 J/cm2 | Free Shrinkage 6 J/cm2 | dispersion of shrinkage (2σ) 1.5 J/cm2 | 4 J/cm2 | 6 J/cm2 | Free shrinkage (B) by light Classification |
|---|---|---|---|---|---|---|---|---|---|---|---|---|---|---|---|---|---|
| Working example II-2 | UV light I | Film I | 8% | White White White White White | 94% 94% 94% 94% 94% | 86% 86% 86% 86% 86% | — Magenta Cyan Yellow Black | — 40% 88% 40% 97% | — 32% 80% 32% 89% | 94% 97% 97% 97% 97% | 94% | 6% 6% 0% 0% 6% | 43% 43% 44% 49% 38% | 77% 75% 75% 76% 73% | 7% | 8% | 3% | A |
| Working example II-3 | UV light I | Film I | 8% | Lacquer Lacquer Lacquer Lacquer Lacquer | 87% 87% 87% 87% 87% | 79% 79% 79% 79% 79% | — Magenta Cyan Yellow Black | — 40% 88% 40% 97% | — 32% 80% 32% 89% | 87% 90% 90% 90% 90% | 87% | 0% 0% 0% 0% | 37% 27% 36% 40% 36% | 76 76 76 76 76 | 5% | 10% | 0% | A |

TABLE 10-continued

| | | | photothermic layer | | | Design layer | | | Total layer | | Free Shrinkage (A) by light | | | dispersion of shrinkage (2σ) | | | Appearance after |
|---|---|---|---|---|---|---|---|---|---|---|---|---|---|---|---|---|---|
| | Film | | | | | | | | | | | | | | | | |
| UV device | TYPE | UV abs % ① | Color | UV abs (B+P=②) | UV abs % (P=②-①) | Color | UV abs % (B+D=③) | UV abs % (D=③-①) | UV abs % (B+P+D) | Min abs % | 1.5 J/cm2 | 4 J/cm2 | 6 J/cm2 | 1.5 J/cm2 | 4 J/cm2 | 6 J/cm2 | Classification |
| Working example II-4 | UV light II | Film I | 8% | White | 86% | 78% | — | — | — | 86% | 86% | 48% | 69% | 76% | 7% | 5% | 2% | A |
| | | | | White | 86% | 78% | Magenta | 31% | 23% | 93% | | 50% | 63% | 78% | | | | |
| | | | | White | 86% | 78% | Cyan | 85% | 57% | 97% | | 56% | 68% | 78% | | | | |
| | | | | White | 86% | 78% | Yellow | 52% | 44% | 97% | | 50% | 65% | 77% | | | | |
| | | | | White | 86% | 78% | Black | 98% | 90% | 97% | | 56% | 68% | 77% | | | | |
| Working example II-5 | UV light III | Film I | 8% | White | 69% | 61% | — | — | — | 69% | 69% | 36% | 63% | 76% | 13% | 12% | 2% | A |
| | | | | White | 69% | 61% | Magenta | 33% | 25% | 87% | | 43% | 71% | 77% | | | | |
| | | | | Whew | 69% | 61% | Cyan | 45% | 37% | 87% | | 42% | 68% | 78% | | | | |
| | | | | White | 69% | 61% | Yellow | 60% | 52% | 97% | | 47% | 77% | /8% | | | | |
| | | | | White | 69% | 61% | Black | 94% | 86% | 97% | | 53% | 77% | 78% | | | | |

*Irradiation over 0.4 J/cm2 make film shrunk by radiation heat, not generating heat.

Example 3

As with Example 2, the films of Example 3 comprise a base layer, a photothermic layer and a design layer. The multi-layer shrink films of Example 3 are listed in Table 11.

The results of experiments conducted on the films of Example 3 are given in Table 11. The top part of Table 11 discloses experiments on the indicated films, whereas the bottom part of Table 11 describes the results of the carousel and around shrink test performed on working examples II-4. II-1 and III-2.

In the method used to measure the free shrinkage, samples of the multi-layered films were first prepared. These samples each had dimensions of: 50 mm in the transverse direction (TD) 15 mm in the machine direction (MD).

Then: (1) Each sample was placed on a PET sheet that has not been treated with any coating. (2) Each sheet was then placed on a conveyer belt and passed under the UV light source in a constant condition. (3) The free shrinkage was then calculated using:

Shrinkage (%)=$(L_0-L_1)/L_0*100$; with $L_0$: Length of transverse direction before irradiation $L_1$: Length of transverse

TABLE 11

| | | | Shrink test of products | | | | | | | |
|---|---|---|---|---|---|---|---|---|---|---|
| | | Film | | pholothermic layer | | | Design layer | | Total layer | |
| | | | | | UV | | UV | UV | UV | |
| | UV device | TYPE | UV abs % ① | Color | abs % (B + P = ②) | abs % P = ②−① | Color | abs % (B + D = ③) | abs % (D = ③ − ①) | abs % (B + P + D) | Min abs % |
| Working example III-1 | UV light II | Film II | 9% | White | 86% | 77% | — | — | — | 86% | 86% |
| | | | | White | 86% | 77% | Magent | 32% | 23% | 93% | |
| | | | | White | 86% | 77% | Cyan | 65% | 56% | 97% | |
| | | | | White | 86% | 77% | Yellow | 53% | 44% | 97% | |
| | | | | White | 86% | 77% | Black | 98% | 89% | 97% | |
| Working example III-2 | UV light II | Film III | 7% | White | 86% | 79% | — | — | — | 86% | 86% |
| | | | | White | 86% | 79% | Magent | 31% | 24% | 93% | |
| | | | | White | 86% | 79% | Cyan | 64% | 57% | 97% | |
| | | | | White | 86% | 79% | Yellow | 52% | 45% | 97% | |
| | | | | White | 86% | 79% | Black | 98% | 91% | 97% | |

| | UV device | Film TYPE | Min Abs % | Carousel shrink Classification | Around shrink Classificaiton |
|---|---|---|---|---|---|
| Working example II-4 | UV light II | Film I | 86% | A | A |
| Working example III-1 | UV light II | Film II | 86% | A | A |
| Working example III-2 | UV light II | Film III | 86% | A | A |

Experiment to Analyze the Percentage of UV Absorption

In Examples 1, 2 and 3, the UV absorption was measured using a UV spectrometer of the type Shimadzu UV-VIS Recording spectrophotometer UV-2401PC. The UV absorption was calculated from transmittance and reflectance as measured using the standard ISO13468-2 (=JIS K 7361-2).

In Examples 1 to 3, the UV absorption of the multi-layer film and a part of multi-layer film or same formulations as the part of the multi-layer film was measured. Firstly, the transmittance and reflectance of the film were measured. Secondly, the UV absorption percentage was calculated using:

UV absorption %=100−(transmittance+reflectance)

In addition, the UV absorption of the photothermic layer was measured. This was achieved by: (1) Measuring the UV absorption of only the base layer film (2) Measuring the UV absorption of the photothermic layer and the base layer film (3) Calculating the UV absorption of the photothermic layer as follows:

UV absorption of the photothermic layers=(2)−(1)

A similar method was used to calculate the UV absorption of the design layer (if present).

Free Shrink Test

In the tables, the free shrinkage by light has also been measured.

direction after irradiation In addition, the appearance of the shrunken sample was checked and classified either A or B:
A—if there was an even shrink,
B—if there was an uneven shrink In Examples 1 to 3, three samples of each example listed in the tables were used and the average value (i.e. the mean value) obtained from these three samples is given in the tables.

Carousel Shrink Test

In Example 3, a carousel shrink test was also performed. This test involved: (1) Preparing a lay-flat sample (a seamed tubular sleeve laid flat) that has a width of 72 mm and a cut height (or pitch) of 95 mm in size (2) The sample was then formed into a sleeve and arranged around a bottle so that a maximum shrinkage of 30% is required to fit the sleeve to the bottle (3) The bottle and sample were then placed in the middle of a set of six UV lights of type UV light II with a rod lens and spun around at 200 bpm (4) The sample was then irradiated with 7 J/cm of UV light II (5) After shrinking, the appearance was checked an classified as either A or B, where: A—indicates shrinking without concentration by colour influence B—indicates shrinking with concentration by colour influence.

Around Light Shrink Test

In Example 3, an around light shrink test was additionally performed. This test involved: (1) Preparing a lay-flat sample that is 72 mm by 95 mm in size (2) The sample was then formed into a sleeve and arranged around a bottle so that a maximum shrinkage of 30% is required to fit the sleeve to the bottle. (3) The bottle and sample were then placed in the middle of a set of four UV lights of type UV light II with a ROD lens. These four UV lights are arranged in a square configuration around the bottle. (4) The bottle was then moved vertically at a speed of 1 m/min through the middle of the square of UV lights so that the sample is irradiated at 24 J/cm². (5) After shrinking, the appearance was checked and classified as for the carousel test.

We claim:

1. A method of activating the shrink characteristic of a multi-layered film, the method comprising the steps of:
   (a) providing a multi-layered film comprising at least
      (i) a base layer film comprising a shrinkable film and defining one or more edge parts,
      (ii) a photothermic layer, associated with the base layer film and covering the base layer film except for one of the edge parts, and the photothermic layer comprising a photothermic material, wherein the base layer is substantially free from the photothermic material, and
      (iii) a design layer comprising a printing layer having the photothermic material, wherein the design layer forms a pattern of discontinuous regions; and
   (b) exposing the multi-layered film to electromagnetic radiation in order for the photothermic material to shrink the multi-layered film; wherein the electromagnetic radiation comprises UV-light having a peak wavelength between 200 nm and 399 nm, and at least 90% of the UV-light is within a bandwidth of ±30 nm of the peak wavelength.

2. The method according to claim 1, wherein the UV-light is emitted by a LED-UV emitter.

3. The method according to claim 1, wherein the photothermic layer is provided in direct contact with the base layer film.

4. The method according to claim 1, wherein the multi-layered film has a UV absorption of at least 50%, calculated from transmittance and reflectance as measured by ISO13468-2.

5. The method according to claim 1, wherein the design layer comprises a colored ink composition.

6. The method according to claim 1, wherein the multi-layer film is substantially homogeneously shrunk independent from the pattern of discontinuous regions of the design layer.

7. The method according to claim 1, wherein the multi-layer film has a UV shrinkage of at least 15% in main shrinking direction as obtained by exposure to UV light of 6.0 J/cm2.

8. The method according to claim 1, wherein the base layer film has a free shrink in main shrinking direction of less than 10% after immersion in water at 60° C. for 10 sec.

9. The method according to claim 1, wherein the photothermic layer comprises a photothermic composition comprising one or more binder resins and from 3 to 80 wt.% of the photothermic material relative to the photothermic layer.

10. The method according to claim 9, wherein the photothermic material comprises UV-light absorbing material selected from the group consisting of (white) titanium dioxide (TiO2); (black) carbon black; (cyan) phtalocyanide; (magenta) quinacridone, diketopyrrolopyrrole, naphtol-based azo pigment, anthraquinone; (yellow) aceto acetic acid-and/or anhydride-based azo pigment; dioxiazine and benzotriazole UV absorber, benzo triazole, benzo phenone, salicylate, triazine and/or cyano acrylate type of UV absorber; and combinations thereof.

11. The method according to claim 9, wherein the photothermic material comprises from 20 to 80 wt.% of titanium dioxide relative to the photothermic layer.

12. The method according to claim 9, wherein the photothermic material comprises a transparent lacquer composition comprising a benzotriazole UV absorber.

13. A method for manufacturing a sleeved product, the method comprising:
   (a) arranging a sleeve around the product, the sleeve comprising:
      (i) a multi-layered film comprising at least a base layer film comprising a shrinkable film, a photothermic layer associated with the base layer film and comprising a photothermic material, wherein the base layer film is substantially free from the photothermic material, and a design layer comprising a printing layer having the photothermic material, wherein the design layer forms a pattern of discontinuous regions, and
      (ii) a seam area comprising two edge parts of the multi-layered film configured to be overlapped to form a seam, wherein the photothermic layer covers the base layer film except for one of the edge parts; and
   (b) exposing the sleeve to electromagnetic radiation in order for the photothermic material to shrink the multi-layered film, wherein the electromagnetic radiation comprises UV-light having a peak wavelength between 200 nm and 399 nm, and at least 90% of the UV-light is within a bandwidth of ±30 nm of the peak wavelength.

14. The method according to claim 13, wherein the sleeve is provided in a flat form and wrapped around a mandrel, whereby the two sleeve edge parts to be sealed overlap and/or contact each other in the seam area, and the edges are sealed to provide a tubular sleeve, whereafter the sleeve is opened and ejected around the product.

15. The method according to claim 13, wherein the sleeve is provided in a preformed tubular form and arranged around the product.

16. The method according to claim 13, wherein at least one of the edge parts does not comprise the photothermic layer in the seam area.

17. The method according to claim 13, wherein the electromagnetic radiation comprises UV-light having a peak wavelength of 365 nm, 385 nm or 395 nm, wherein at least 75% of the UV-light is within a bandwidth of ±10 nm of the peak wavelength.

* * * * *